United States Patent [19]

Boots

[11] 4,367,675
[45] Jan. 11, 1983

[54] DEVICE FOR ORIENTING AND TOPPING TAPERED VEGETABLES

[75] Inventor: Gordon C. Boots, Orlando, Fla.

[73] Assignee: A. Duda & Sons, Inc., Oviedo, Fla.

[21] Appl. No.: 209,771

[22] Filed: Nov. 24, 1980

[51] Int. Cl.$^3$ ............................................. A23N 15/04
[52] U.S. Cl. ....................................... 99/546; 99/635; 99/643; 209/570; 209/674
[58] Field of Search ............................ 99/546, 635–643; 209/539–541, 544, 545, 674, 925

[56] References Cited

U.S. PATENT DOCUMENTS

| | | | |
|---|---|---|---|
| 1,875,072 | 8/1932 | Maryott | 99/635 |
| 3,682,301 | 8/1972 | Ross | 209/540 |
| 3,800,693 | 4/1974 | Lent | 99/643 |

Primary Examiner—Philip R. Coe
Assistant Examiner—Timothy F. Simone
Attorney, Agent, or Firm—Julian C. Renfro

[57] ABSTRACT

A machine for effecting an orientation of carrots or other elongate, tapered vegetables placed thereon, comprising a vibratory table of elongate configuration whose upper surface is principally constituted by a plurality of generally parallel members. These members are spaced along the longitudinal centerline of the table, with the spacing between members increasing incrementally such that the minimum spacing between members exists at one end of the table, and the maximum spacing exists at the other end. Alignment means are utilized such that elongate vegetables cuased to be individually aligned with the longitudinal axis of the table can travel for a substantial portion of the length of the table, bridging at least some of the spaces between members. Vibration producing means are connected to the vibratory table for inducing sufficient vibration into the spaced members as to cause the elongate vegetables to travel toward the other end of the table until such time as each vegetable has reached a space between two members that it is unable to bridge, at which time it falls crown end first between such pair of members. My machine may be effectively utilized in connection with the sorting of vegetables to length, but it is more typically utilized with a topping device for effectively removing the crown end from each of the elongate vegetables.

10 Claims, 11 Drawing Figures

DEVICE FOR ORIENTING AND TOPPING TAPERED VEGETABLES

BACKGROUND OF THE INVENTION

Carrots often grow with the top portion of the root extending above the soil level, thus exposing this portion, known as the crown, to sunlight. This exposure will promote photosynthesis in the crown with a resultant shift to shades of green. Carrots harvested for the fresh market often exhibit this trait, but this is not considered a defect in the fresh market place, whereas in almost all cases, carrots used for processing require removal of the crown and all traces of green before processing can be accomplished.

Carrots that are grown strictly for processing often have their crowns removed while they are still in the ground, with this typically being accomplished by a harvesting machine operating somewhat on the principle of a potato harvester.

In many instances, a decision may not as yet have been made as to the disposition of carrots being harvested, for they may be sold either in the market place, or else sold to a processor. With regard to carrots delivered to the processor, he must remove the crown portions before the principal portions of the carrots can be processed.

Although most of the machinery concerned with the processing of carrots is by and large automatic, up until the present time, no truly satisfactory arrangement has been provided for removing crowns from carrots preparatory to the carrots being sent for further processing. A recent study of this part of the food industry has revealed that hand labor is still being resorted to in many instances in order that this task may be accomplished.

In accordance with the usual present day procedures, the carrots to be processed are taken either before or after a washing and peeling operation, to a distribution point in the processing plant, where the carrots move along a series of tables. At these tables, a dozen or so laborers equipped with small hand loaded cutting devices proceed to cut the crowns off of the carrots.

My investigations have revealed no crown removal arrangement more satisfactory than this type of operation, for no automatic machinery has to date been available.

It is accordingly a purpose of this invention to provide an automatic arrangement for cutting crowns off carrots or other elongate vegetables in a rapid, highly satisfactory and inexpensive manner, by the use of noncomplex machinery requiring minimal adjustment.

SUMMARY OF THE INVENTION

In the process of designing a satisfactory machine for automatically removing the crown end from carrots, it is first necessary to address the problem of enabling the machine to recognize which is the crown end. I have evolved a machine comprising an elongate, angled vibratory frame utilizing a plurality of stepped members on its upper surface, along which carrots can travel under the combined effects of gravity and vibration. These stepped members are placed in a descending relationship as a result of a downward angling of the vibratory frame, and the movement of the carrots down along the stepped members is induced by the presence of vibration applied to the frame by an appropriate mechanical or electro-mechanical means, such as an electrically driven shaker drive.

The stepped members are placed at progressively increasing distances apart, and are each of corrugated material. Importantly, the corrugations of the dozen or so stepped members used on the surface of the vibratory frame are in alignment, such that the carrots will be caused to travel down the stepped array of corrugated members either tip first or crown first, but in either instance, in an aligned array.

Carrots possessing a long tapered configuration have been relatively easy for my machine to deal with, for the crown end is decidedly heavier than the tapered end, and the crown ends will therefore reliably fall first between the stepped members at such time as a span of a certain width has been reached.

Carrot varieties possessing a substantially cylindrical shape, or carrots that have been broken, are much more difficult to deal with, although as will be explained hereinafter, my machine in most instances can reliably orient and remove the crown end.

In order to better understand the operation of my machine, a brief study should be made of the physical configuration of a typical carrot.

In the usual tapered variety, the center of gravity of a carrot lies closer to the crown than to the tip, and this fact makes it possible for a balance operation to be conducted, which leads to each carrot dropping crown end first into a device for accomplishing crown removal. I choose to call the dimension from the crown to the center of gravity the balance length. Subtracting the crown-to-CG length from the tip-to-CG length yields a distance I call the balance difference.

I have found that the average carrot has a balance difference that is about 20 percent of the overall carrot length, whereas a highly tapered carrot having considerable length may have a balance difference of approximately 40 percent of the overall length. On the other hand, carrots of a relatively untapered configuration, or that have been broken or deformed, may have a balance difference of only about five percent of the overall carrot length.

In establishing the placement of the stepped corrugated members on the upper surface of my novel angled vibratory frame so that the carrots of a given batch will be dealt with properly, it is first necessary to determine the minimum and maximum balance lengths to be handled. One method of making this determination is to sample the shortest and longest carrots to be oriented, with the center of gravity being carefully established and the balance lengths being measured. Once the maximum and minimum balance lengths have been determined, then the first opening or span of the machine will be designed to equal the minimum balance length. In other words, the second stepped member will be spaced away from the first stepped member a distance that will enable carrots having this minimum balance length to drop between these two members, onto a belt associated with a crown removal device.

Thereafter, the succeeding stepped members will be placed on the angled vibratory frame at successively greater distances apart so that carrots having a longer balance length will in each instance fall off at the appropriate locations. The final opening of the vibratory frame should equal the longest balance length sampled.

When the carrots are being sampled they should be checked for balance difference in at least three size ranges; small, medium and large. The carrots which should be measured are those which exhibit the least taper, for they will have the shortest balance difference. This information will allow the operator to space the openings in a progressive manner, starting with the shortest carrots and expanding the opening width by the balance difference dimension in each size range until the maximum opening is obtained.

As should now be apparent, carrots placed at the upper end of the vibratory table are caused to move along the table, falling between the stepped members at a number of different locations of the vibratory table, with the exact location that a given carrot falls being closely relatable to its balance length. In each instance, the carrots fall crown first, regardless of whether they are traveling crown first or tip first.

In accordance with a preferred embodiment, the carrots fall into chutes that empty onto a special form of angularly disposed conveyor belt that is of similar length to the vibratory table, and located somewhat below it. The conveyor belt is provided with a particular form of partitions called cleats, and this fact, coupled with the angling of the belt, enables the carrots falling down the chutes crown first, to become disposed crown down at an angle about 50° from the vertical. By providing cutoff means at the far end of the conveyor belt, the crown ends can be readily and reliably removed.

I am not limited to an arrangement wherein my orienting device is used in concert with a crown cutoff device, and as one alternative, each chute utilized in the space between each spaced pair of corrugated members can be arranged to deliver onto a respective conveyor belt, so that carrots of particular lengths can be delivered to designated packaging sites.

In almost every instance, the longer carrots fall at the end of the vibratory table remote from its loading location, where the span between members is the greatest. As a result of the partitioned conveyor belt moving in a direction opposite the direction of travel of the carrots along the vibratory frame, the largest carrots are caused to enter upon the conveyor belt at what may be regarded as its lower end. This is advantageous in the instance when the crown cutoff device is being used in that the large carrots will reside on the bottom part of the belt, and the smaller carrots, which enter nearer the crown removal means, will be deposited on top of the carrots that had arrived earlier. This is desirable inasmuch as this stacking will be more orderly and the carrots will be cut more uniformly than would have been the case had the smaller carrots been on the bottom.

Although my machine thus primarily functions as an orienting device making it possible for crown removal to thereafter be automatically accomplished in a consistent manner, my machine can, as previously mentioned, also function to grade carrots according to length. In both cases the stepped, corrugated members are mounted on the vibratory frame at increasingly greater distances apart, such that carrots traveling the length of the frame proceed across increasingly wider openings. Ultimately, each carrot falls, crown first, through the opening which first approximates the length from the crown end to the center of balance of the carrot. Because each next corrugated member is placed lower on the vibratory table than the preceding one, a curved carrot cannot hook into the lower member and then drop prematurely, as was prone to occur in prior art devices of this general type, which accomplished a grading to length by the use of a plurality of different size holes.

Returning to the discussion of my machine as an orienting device, it is to be noted that although separate chutes are provided between and below each adjacent pair of stepped, corrugated members, these chutes all lead, in the preferred embodiment of my device, to the partitioned conveyor belt of the crown removal apparatus, which belt runs parallel to the vibrating table, and in a direction opposite to the direction of the downward slant of the table.

As an alternative to merely cutting off the crowns, a plurality of circular knives mounted at spaced locations on a common rotary shaft can be utilized at the terminal end of the conveyor belt for cutting all of the carrots into a plurality of consistent lengths. For example, in addition to having their crowns removed, the carrots can be cut into say 2" lengths if they are to be used for cooking purposes, whereas if the carrots are thereafter to be sliced in connection with say a school lunch program, they can be cut into 4" lengths by the knife arrangement. The carrots can thereafter be sliced lengthwise by another machine.

As will be described at length hereinafter, my machine can be manufactured at low cost, and may be adjusted so as to function properly in connection with any of a number of types and varieties of elongate tapered vegetables.

As should now be apparent, it is a primary object of my invention to provide an inexpensive machine serving to act upon carrots or other elongate tapered vegetables such that the crowns thereof all become aligned in the same direction, thus making it possible for the crowns to be readily and inexpensively removed.

It is another object of my invention to provide a carrot orienting device utilizing a number of progressively spaced corrugated members on its upper surface along which the carrots may move, with the spacing between the corrugated members increasing at a small increment in each instance, so that the crowns of even those carrots having a small balance difference will still be properly oriented.

It is yet another object of my invention to provide a machine that will consistently orient carrots or other elongate vegetables, even though they have become broken, or are misshapen.

It is still another object of my invention to provide an orienting machine of effective and low cost design, which may be used either in connection with a crown removal device, or in concert with a series of conveyor belts such that carrots or other elongate tapered vegetables can be sorted by length.

These and other objects, features, and advantages will become more apparent as the description proceeds.

BRIEF DESCRIPTION OF DRAWINGS

FIG. 3a is a simplified showing of the arrangement for supporting the vibratory table so that its vibration can be maximized;

DETAILED DESCRIPTION

Figure 1:
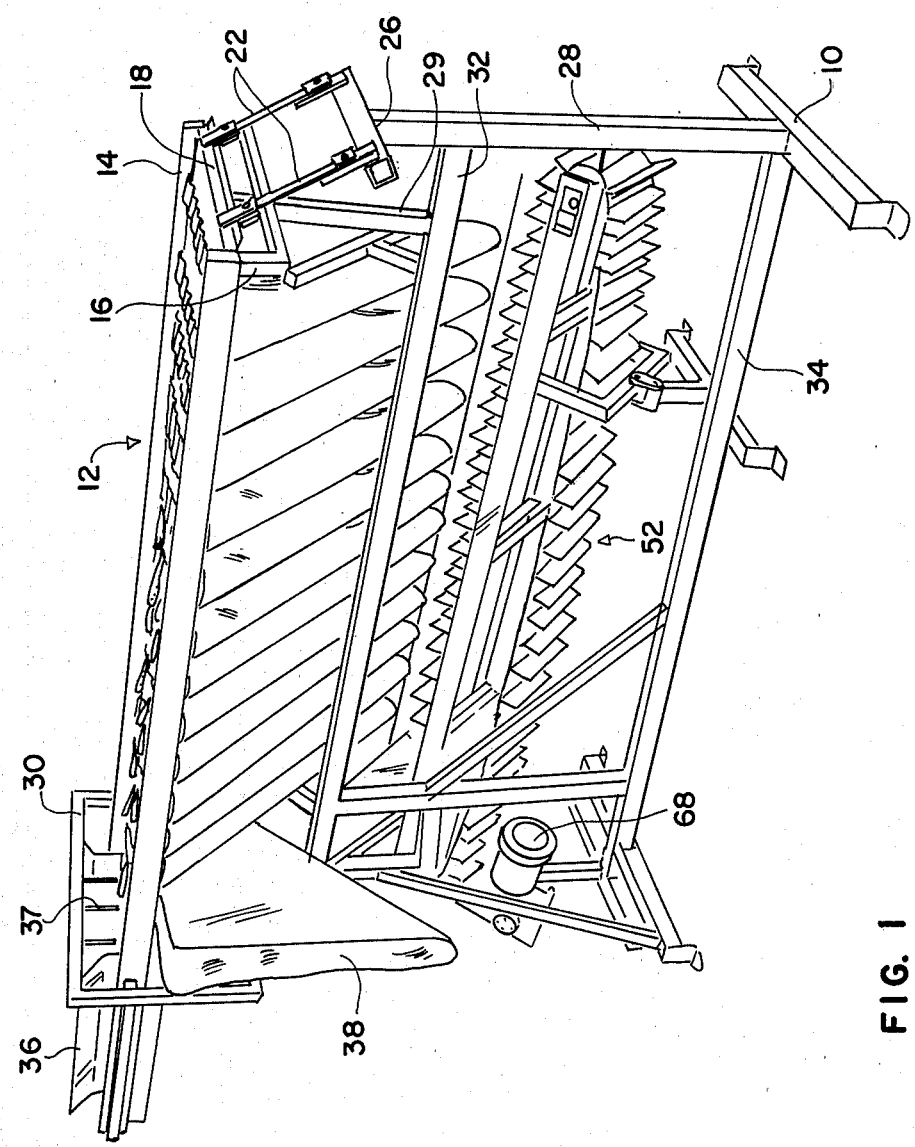
FIG. 1 is a perspective view of my novel device for orienting and topping tapered vegetables.

Turning to FIG. 1, it will there be seen that I have shown an exemplary form of a device for accomplishing an alignment or orientation of carrots or other elongate tapered vegetables such that their crown ends can be easily and automatically removed by an ancillary piece of equipment, or optionally, a grading to length operation performed.

Figure 2:
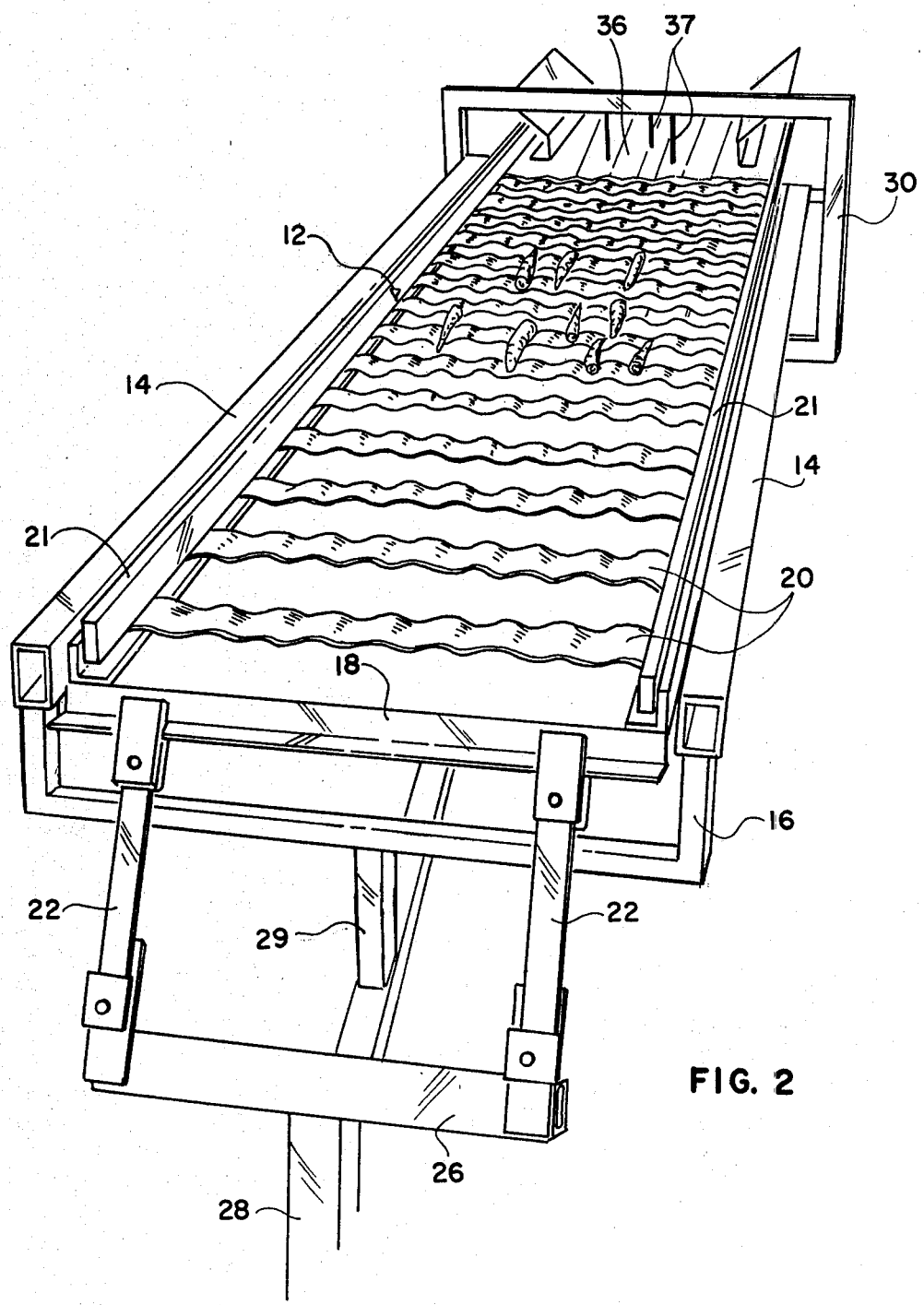
FIG. 2 is a perspective view to a somewhat larger scale of the vibratory table portion of my invention.

A basic framework 10 preferably of steel members welded or bolted together is utilized, upon which a novel vibratory frame 12 is supported in an angled relationship. As shown in FIG. 2, the vibratory frame 12 is supported between a pair of stationary elongate members 14, the lower ends of which members are supported by a generally U-shaped member 16, that serves to hold the elongate members 14 at the desired spacing. As will be observed in FIG. 2, the upper surface of the vibratory frame is principally constituted by a plurality of corrugated members 20, secured in a spaced array, with their corrugations in careful longitudinal alignment. Longitudinal members 21 may be utilized to secure the members 20 in the proper locations. Certain details of this important aspect of my invention will be described at greater length hereinafter.

Figure 3:
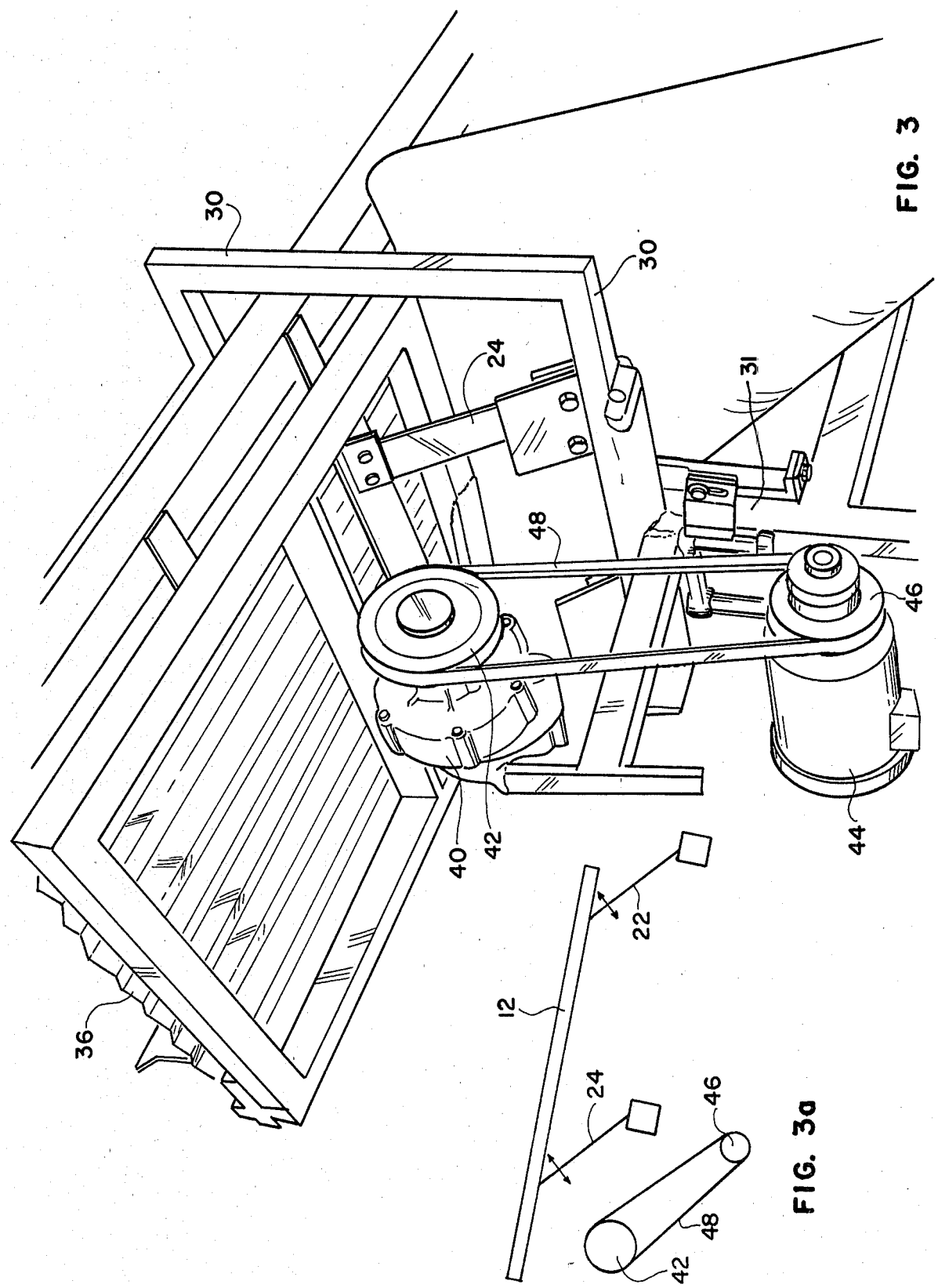
FIG. 3 is a fragmentary view of a portion of the underside of my novel vibratory table, showing the means utilized for achieving vibration.
Figure 4:
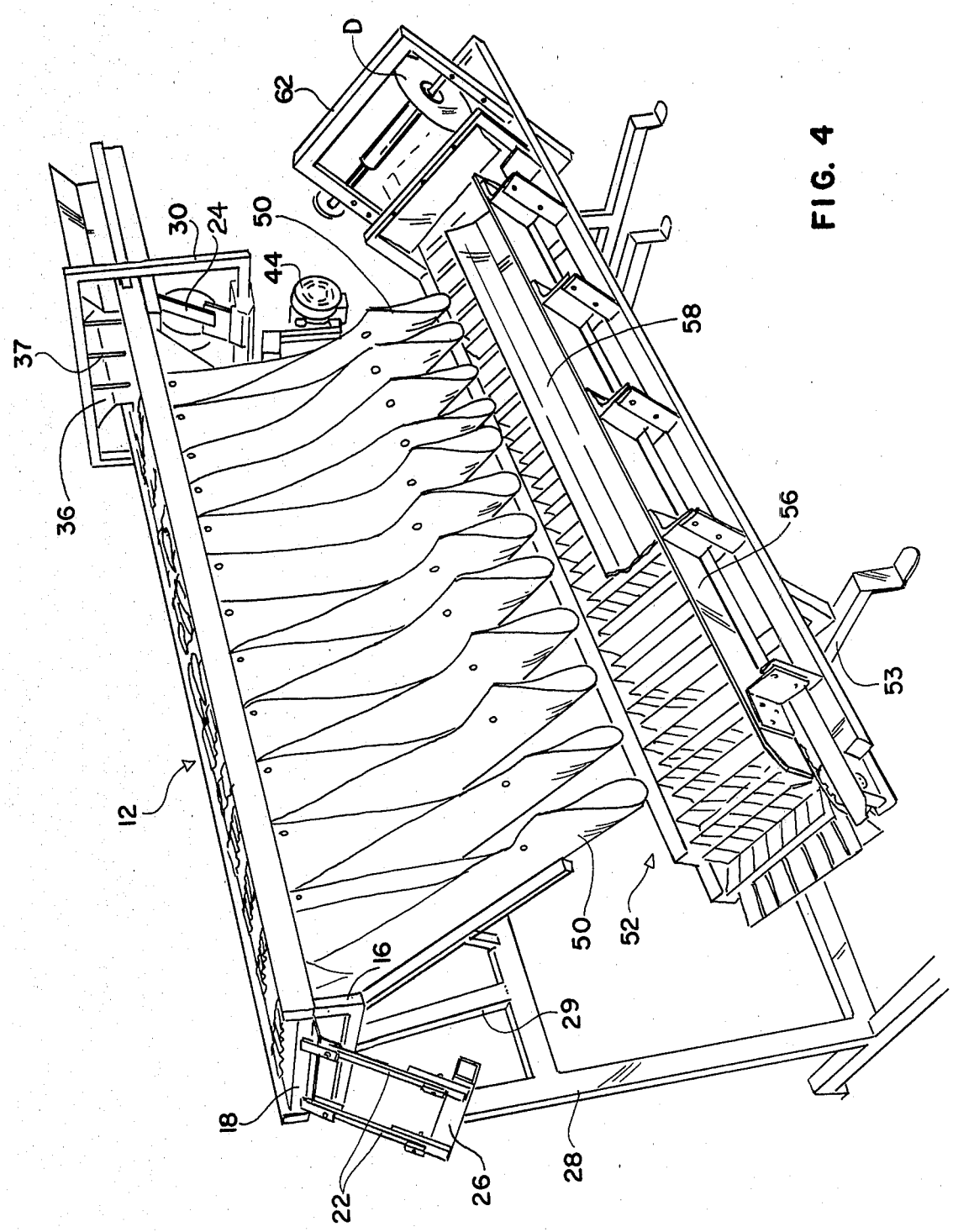
FIG. 4 is a perspective view illustrating how a carrot-topping machine can be used in concert with my novel vibratory table orienter.

As shown in FIGS. 1, 2 and 4, the lower end of the vibratory frame 12 is supported by a generally horizontal member 18 that is in turn supported by a pair of fiberglass leaf springs 22. As revealed by FIG. 3, the vibratory frame is supported at its upper end by a pair of fiberglass leaf springs 24. The leaf springs 22 are supported by a short, horizontally disposed structural component 26 that is in turn supported from vertical member 28 of the framework, whereas the pair of leaf springs 24 are supported, as shown in FIG. 3, from structural component 30, a portion of which extends above the upper end of the table 12. The component 30 is supported by member 31, and component 30 forms the support for the upper ends of members 14. It is to be noted from the previous Figures, as well as FIG. 3a, that the springs 22 are disposed at approximately a 30° angle to the vertical, and the springs 24 are parallel thereto, also being disposed at approximately 30° angle.

As revealed in FIG. 1, elongate structural members 32 and 34 extend generally horizontally between vertical member 28 and vertical members at the upper end of the device, and serve to hold the members of the framework 10 in a rigid relationship, with the vibratory frame 12 being supported at a slightly downward angle, such as from 5° to 10° to the horizontal.

As shown in several of the early Figures, the corrugated members 20 of the vibratory frame 12 are supported in a stepped, spaced relationship such that carrots placed in a receiving means 36 at the upper end will proceed down along the length of the frame under the combined influence of vibration and gravity. Inasmuch as a certain amount of trash may be mixed in with the vegetables, I provide a slot between the receiving means 36 and the first corrugated member 20, through which slot the trash can fall. As will be noted in FIG. 1, I provide a trash removal chute 38 so that the trash can drop into a suitable receptacle placed there below.

It will be noted in FIGS. 1, 2, 4 and 8 that I have provided a plurality of fingers 37 extending downwardly from the part of member 30 directly over the receiving means 36. These fingers are placed so as to initially align or orient the carrots, so that they will not start down the corrugated members lying sideways. Inasmuch as the bottoms of the fingers 37 are spaced from the part of the receiving means contacted by the carrots, trash does not tend to accumulate on the fingers.

As will be described at greater length hereinafter, the corrugated members 20 are spaced in a graduated arrangement, close together at the upper end of the machine, and gradually spaced further and further apart as the lower end of the machine is approached. Depending on its length and configuration, each carrot proceeding down the valleys of the corrugations will, at some location on the corrugated members, fall between two members, dropping crown end first to a location where crown removal is rapidly effected by means of a crown removal device 52. These details will in turn be discussed.

Each corrugated member 20 may for example have a dimension of 25½ inches from side to side, and a dimension of 3 inches in the direction of the longitudinal centerline of the vibratory frame. The valleys of the corrugations are preferably on 2⅞" centers.

Figure 5:
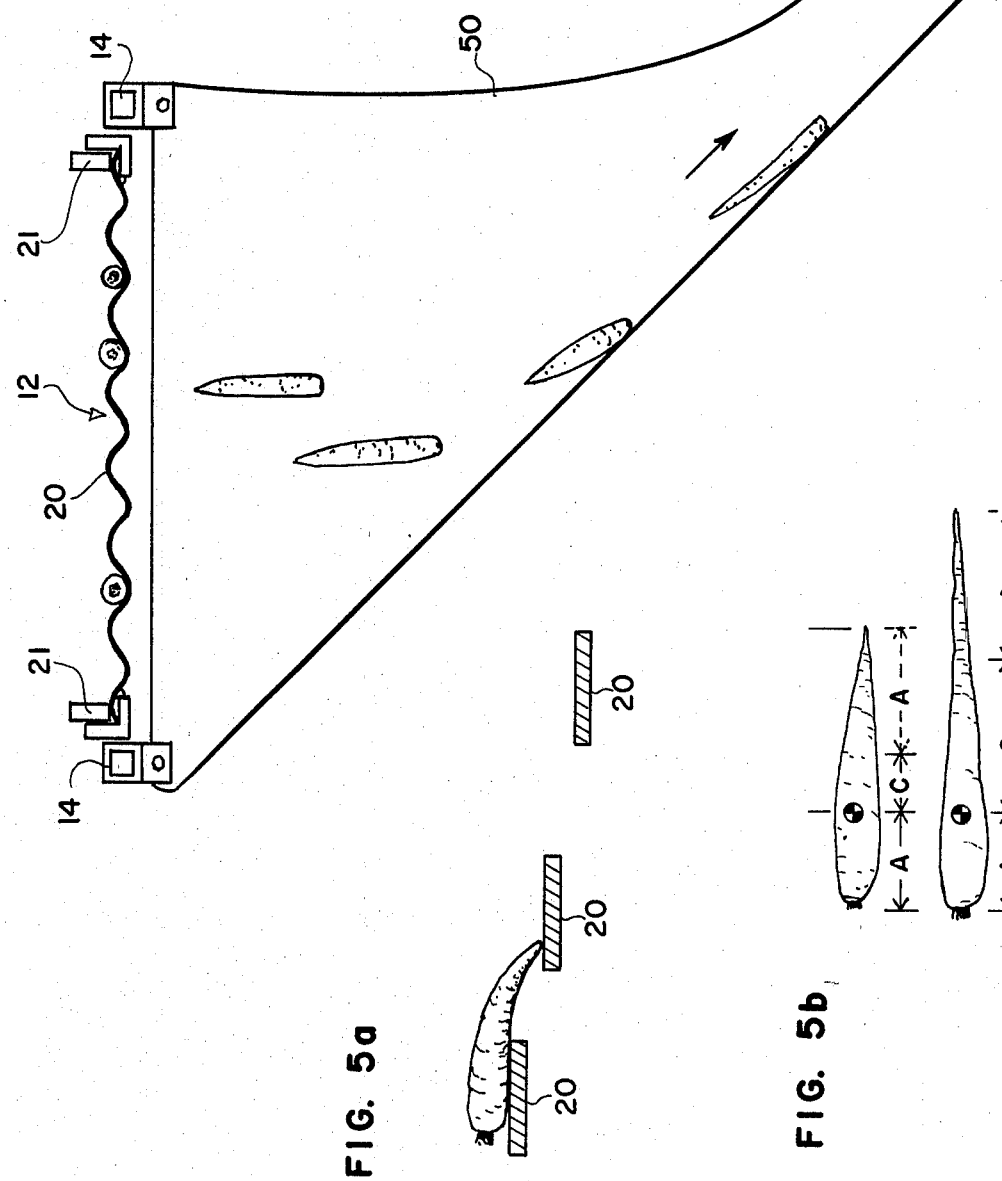
FIG. 5 is a cross-sectional view revealing the use of a chute below each opening in the vibratory table in order that carrots can be conveyed crown first to the conveyor belt used with the carrot topping machine.

As previously mentioned, the vibratory frame 12 is supported between the elongate stationary members 14 by means of the pairs of leaf springs 22 and 24, such that the structural members 14 do not inhibit the vibration of frame 12. The structural members 14 form a support for the carrot-receiving chutes 50, discussed hereinafter, a typical one of which is illustrated in FIG. 5.

Turning again to FIG. 3, it will be noted that I have shown an Ajax shaker drive 40 disposed at the upper end of the machine, with the shaker drive being bolted to the vibratory frame 12 at a location generally below the carrot receiving means 36. The Ajax shaker drive may be manufactured by Reynold, Inc. of Westfield, N.Y., and I prefer Model 5BF. The drive 40 is equipped with a pulley 42, and when this pulley is driven in rotation, it causes the rotation of counterweights internal to the shaker drive 40, and this in turn causes a desirable type of vibration of the frame 12.

The shaker drive 40 is driven by an electric motor 44, which motor is equipped with a spring-biased, variable speed sheave 46. The motor is mounted on the framework 10 below the shaker drive and somewhat offset toward the lower end of the table 12. As a result, the V-belt 48 passing around pulleys 42 and 46 and providing rotation to the shaker drive is inclined at approximately a 30° angle to the vertical, or in other words, approximately conforming to the angle of the fiberglass springs 22 and 24 that form the support for the frame 12. Because of this arrangement, no particular elongating force is applied to the belt 48 during operation of the device.

The reason for the above-described arrangement will become more apparent from an inspection of FIG. 3a, wherein I have shown the vibratory frame 12 in simplified form, supported by angularly disposed springs 22 and 24. This Figure reveals the preferred arrangement that makes it possible for the shaker drive to provide a considerable forward thrust to the carrots resting on the members 20.

Figure 5A:
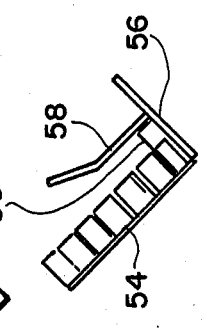
FIG. 5a is a view to a small scale showing how curved carrot can be accommodated on the vibratory table, with my stepped design preventing a curved carrot from hooking under a corrugated member.

The arrangement is such that upon the shaker drive unit being driven in rotation, vibration essentially perpendicular to the springs 22 and 24 takes place, and this causes carrots to move down the corrugations. As a matter of fact, the carrots would move in an aligned array along the valleys of the corrugations of the members 20 due to this vibration even if the members 20 were not in a downwardly stepped array. The principal reason why the members 20 are disposed in a downwardly stepped array is that a curved carrot will not tend to hook under a corrugated member it is approaching, as long as such next member is somewhat lower than the member 20 upon which the carrot is resting at a given moment; note FIG. 5a. This obviates one of the big disadvantages of the perforate plate grader earlier used in grading carrots to length, for often a curved carrot hooked into an opening through which it would not have fallen had the carrot been straight.

Turning to FIG. 4, it will be noted that I have shown the novel vibratory frame from the side essentially opposite the side shown in FIG. 1, with the angled chutes 50 utilized between the pairs of corrugated members being conspicuous in this figure. In the embodiment of my invention depicted in FIG. 4, all of the chutes 50 have their open ends disposed in operative relation to a device 52 disposed essentially parallel to the orienter, which device functions to automatically top the carrots.

This device 52 utilizes an endless cleated conveyor belt 54 known as a "smooth top cleated belt". This belt has partitions or cleats 55 defining spaces that the carrots leaving the chutes readily enter. The crowns come to rest against the stationary base stop 56 extending almost the full length of belt 54. The cleated belt is preferably manufactured by Intralox, and disposed at a rather steep angle, so the carrots entering crown first onto the belt would topple over but for the cleats. I prefer for the plane of the belt to be at a 50° angle from the vertical and for the belt to move in the direction opposite to the movement of carrots along the corrugations of frame 12. I prefer to use cleats 55 disposed on 2" centers, with the cleats being of alternate 2" and 3" heights.

To prevent the carrots from toppling over the base stop 56, I preferably utilize a sheet metal deflector 58, the entrance portion of which is curved upward so that it will not inhibit entry of the carrots; note FIGS. 4 and 5.

FIG. 5 shows in a typical manner how the carrots fall crown first into chute 50, with a separate chute being located between each pair of corrugated members. Each chute is preferably made of a suitable plastic such as 0.020 clear flexible vinyl, inasmuch as very little bounce is experienced when flexible plastic is used. Also, chutes of this construction rarely, if ever, cause any damage to the produce with which they are used.

As FIG. 5 makes clear, the carrots enter the belt 54 crown first, being stopped in the proper locations on the belt by the stop member 56. This member also serves to hold the conveyor belt 54 against the wear strip 57 shown in FIG. 6, which strip is grooved to prevent the inclined belt from sliding downwardly. Curved deflector 58 prevents the carrots from toppling over and falling off the belt, whereas the cleats 55 of the belt serve to keep the carrots residing in a parallel array on the belt. Because of this, the topping operation wherein the crowns are removed can be carried out in an orderly and highly effective manner. As will be noted from FIG. 4, the belt 54 is disposed a consistent distance away from the outlets of the chutes 50.

As previously pointed out, the longer carrots do not drop from the vibratory frame until they reach the lower end, whereas the short carrots drop at the upper end. Accordingly, the longer carrots will arrive in the spaces between the cleats of the belt 54 prior to the arrival of the short carrots inasmuch as the belt is moving in the direction opposite the direction in which the carrots move down along the vegetable alignment means of members 20. Because the larger, longer carrots thus land at the bottom of the slots bounded by the cleats of the belt 54, the carrots residing on the belt end up in a more orderly array than would in most instances have been the case had the smaller carrots arrived first. The alignment of the carrots in an orderly array is aided by the cleats 55 being of staggered height.

Figure 5B:
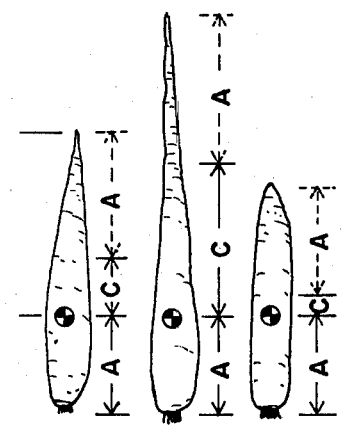
FIG. 5b is a showing of three different carrots of widely varying configuration.

Referring to FIG. 5b, it will be observed that I have there depicted three carrots possessing widely different configurations. It will be noted that the crown ends, as well as the centers of gravity of these three carrots, have been placed in alignment with each other, with the distance from the crown to the center of gravity of each carrot being indicated as distance A. I choose to call the distance A the "balance length", representing in each instance, the distance from the crown to the center of gravity.

If this balance length distance is then re-plotted, measuring from the tip of each carrot, the remainder is obviously different for each of these illustrated carrots, and I prefer to call this remainder the "balance difference", illustrated as the length C. It will be obvious from an inspection of FIG. 5b that each carrot illustrated has the same balance length, but differing balance differences.

The uppermost carrot represents an average shape and the balance difference C is approximately 20% of the overall carrot length.

The middle carrot has a larger than average balance difference, this being in the vicinity of 40% of the overall carrot length. The lowermost carrot illustrated in FIG. 5b has a nearly cylindrical configuration and therefore has a smaller than average balance difference, representing approximately 5% of the overall carrot length. It is possible for a broken or deformed carrot to have a negative balance difference, but this situation is rather uncommon.

The first step in designing a machine to orient carrots or other elongate tapered vegetables is to determine the minimum and maximum balance lengths that the machine is to handle. An obvious procedure is to sample the batch of carrots in order to locate the shortest and longest carrots to be oriented, marking the centers of gravity, and then measuring the balance length A. Once the maximum and minimum balance lengths have thus been determined, then the first opening of the machine, that is, the distance between the first and second spaced members 20, can be set to equal the minimum balance length. Each successive opening is then established at an incrementally increased distance, and it is to be noted that by the use of approximately a dozen or so corrugated members 20, the increments of increase can be spread out so that each can be quite small, thus insuring the proper orientation of even those carrots having a very small balance difference. Termination is attained when the last opening or span equals or exceeds the longest balance length of the carrots sampled.

By utilizing an arrangement whereby the placement of the spaced members 20 can be modified in a relatively easy manner, it is not difficult to readjust, if necessary, the machine when it is to deal with batches of carrots arriving from different growers or suppliers.

As should now be clear, upon successive batches of carrots being dumped, either by hand or conveyor belt, upon the receiving means 36, the carrots commence moving, under the effects of vibration and gravity, along the alignment means of the spaced members, in this instance the valleys of corrugated members. On the basis of the physical characteristics of each carrot, it bridges between members until a certain point is reached, at which time it falls between a certain pair of members 20. It is unimportant whether the carrots move tip first or crown first along the corrugations, for they will still drop crown first.

Figure 6:
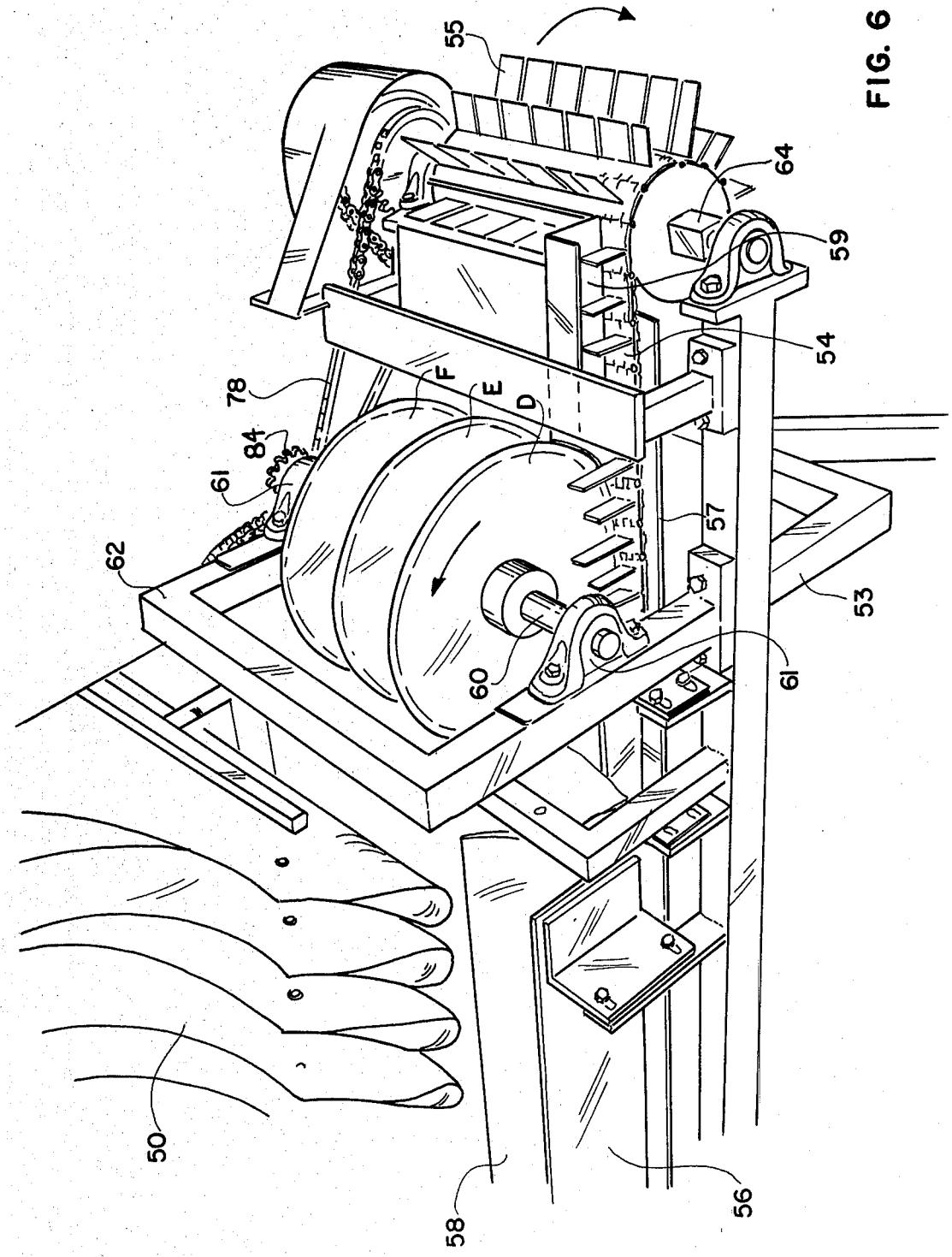
FIG. 6 is a view taken of the circular knives used on the carrot topping machine in order to achieve crown removal and cutting of the carrots to length.

Returning to FIG. 4, it will be noted that, at the terminal end of the crown remover device, I dispose one or more circular knife blades, the lowest of which, blade D, is designed to remove the crowns from the carrots. As shown in FIG. 6, I may also use blades E and F if I wish to cut the carrots say into 2" or 4" sections. These blades are mounted on a shaft 60 which may be, for example, 24 inches long and mounted in suitable bearings 61. The positions of the rotary knife blades on the shaft 60 may be readily modified so that when the carrots are to be cut into sections, the positions of the blades may be selected so that desired carrot lengths will be obtained.

The circular knives D, E and F may, for example, be 14 inches in diameter, and preferably rotate in a direction coinciding with, rather than in opposition to, the direction of travel of the upper surface of belt 54. As will be noted from the several related figures, it is necessary for slots to be cut into the cleats 55 of the belt 54 in order for the circular knives used on shaft 60 to have proper access to the carrots that are to be sliced.

With particular reference to FIG. 6, it is to be noted that the base stop 56 terminates short of knife blade D, which means that the crowns, which are not to be retained, are allowed to fall into a receptacle (not shown) located below the blade D, from which receptacle they are discarded. It is important to note that I provide a crown separator 59 spaced closely adjacent the rear edge of the rotary knife D, as shown in FIG. 6. This member is preferably of sheet metal or sturdy plastic, and it serves to prevent the saleable, cut up portions of the carrots from mingling with the severed crowns that are to be discarded. Inasmuch as the portions of the carrots to be retained are caused by the separator 59 to remain longer on the belt, a receptacle is placed below the end of the belt in order to receive same.

From FIG. 6, it will be noted that the shaft 60 utilized for support of the circular knives D, E and F, is mounted in bearings 61 attached to the somewhat U-shaped framework 62, with shaft 60 being generally parallel to the shaft 64 utilized for applying power to the belt 54. U-shaped framework 62 is supported by the main framework 53 of the crown removal device 52.

Figure 7:
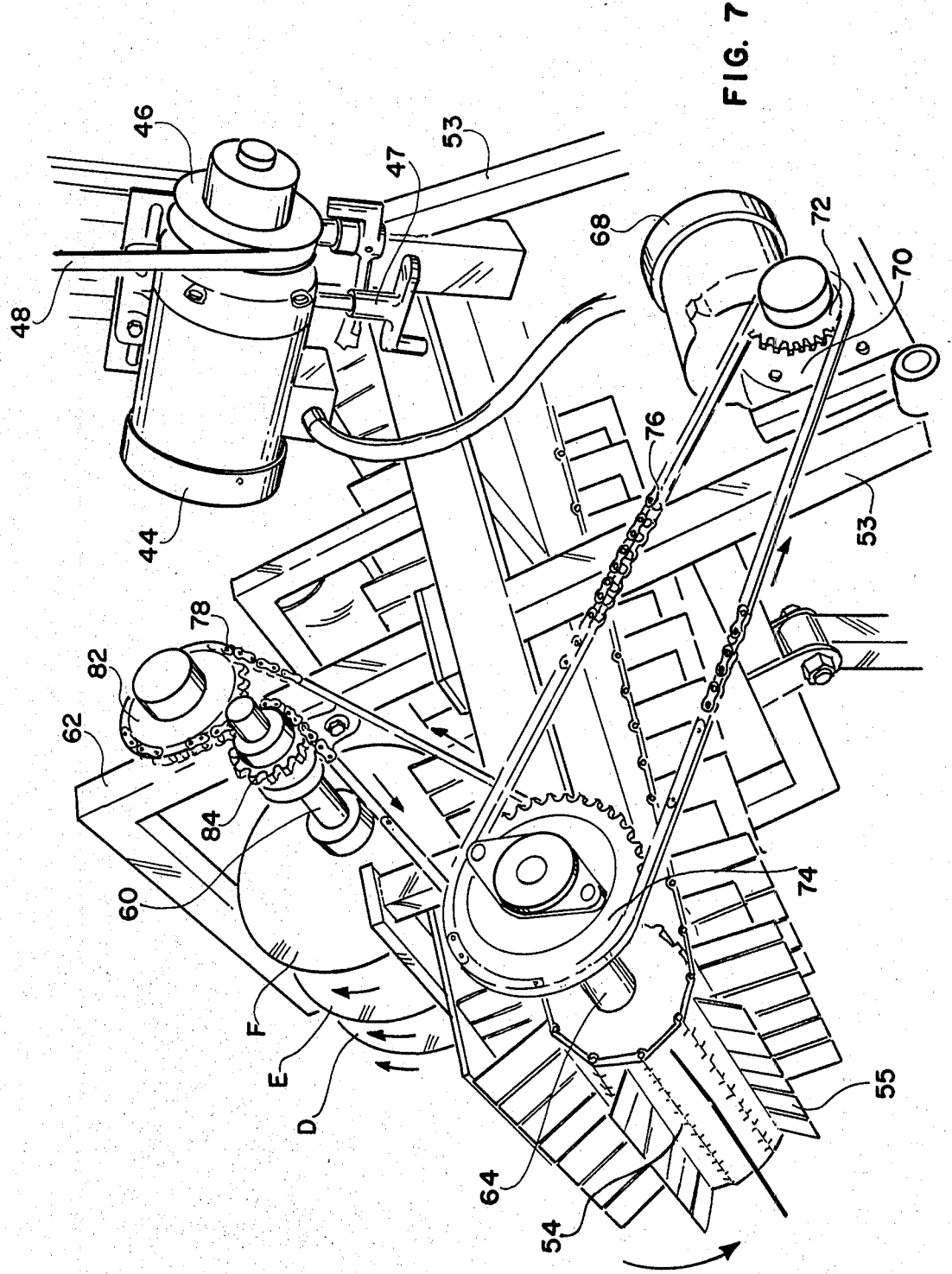
FIG. 7 is a view of the drive arrangement for the conveyor belt of the topping machine, and for causing rotation of the circular knives.

As shown in FIGS. 6 and 7, power is applied by a chain drive to shaft 64, so that the cleated belt 54 will be caused to turn in the desired direction, as shown by arrows in these figures. The circular knives and their shaft 60 turn in the opposite direction to the shaft 64, and the peripheral speed of the knife blades is typically twice that of the belt, but the peripheries of the knife blades move, as previously mentioned, in a belt-aiding direction.

As shown in FIG. 7, I mount a drive motor 68 on the base part of the framework 53 used for supporting the belt 54 and the circular knife arrangement, with a speed reducer 70 preferably being utilized so that chain sprocket 72 will be caused to rotate at a desired speed. A unitary motor and speed reducer may be used if desired. As shown in FIG. 7, I prefer to utilize a chain sprocket 74 on the end of shaft 64 remote from the crown discharge location, and an endless chain 76 is arranged to pass around the sprocket 74 as well as around the sprocket 72 adjacent the motor 68 so that power can be readily applied for driving the belt 54.

Another endless chain 78 passes around the inner sprocket (not shown) of shaft 64 as well as an idler sprocket 82 mounted on framework 62, so that power may be applied in the desired direction to the knife blade shaft 60 by virtue of the utilization of a small sprocket 84, which is located between sprockets 74 and 82.

Also visible in FIG. 7 is a sheave adjustment means 47 such that the speed of the shaker drive 40 may be readily adjusted.

Figure 8:
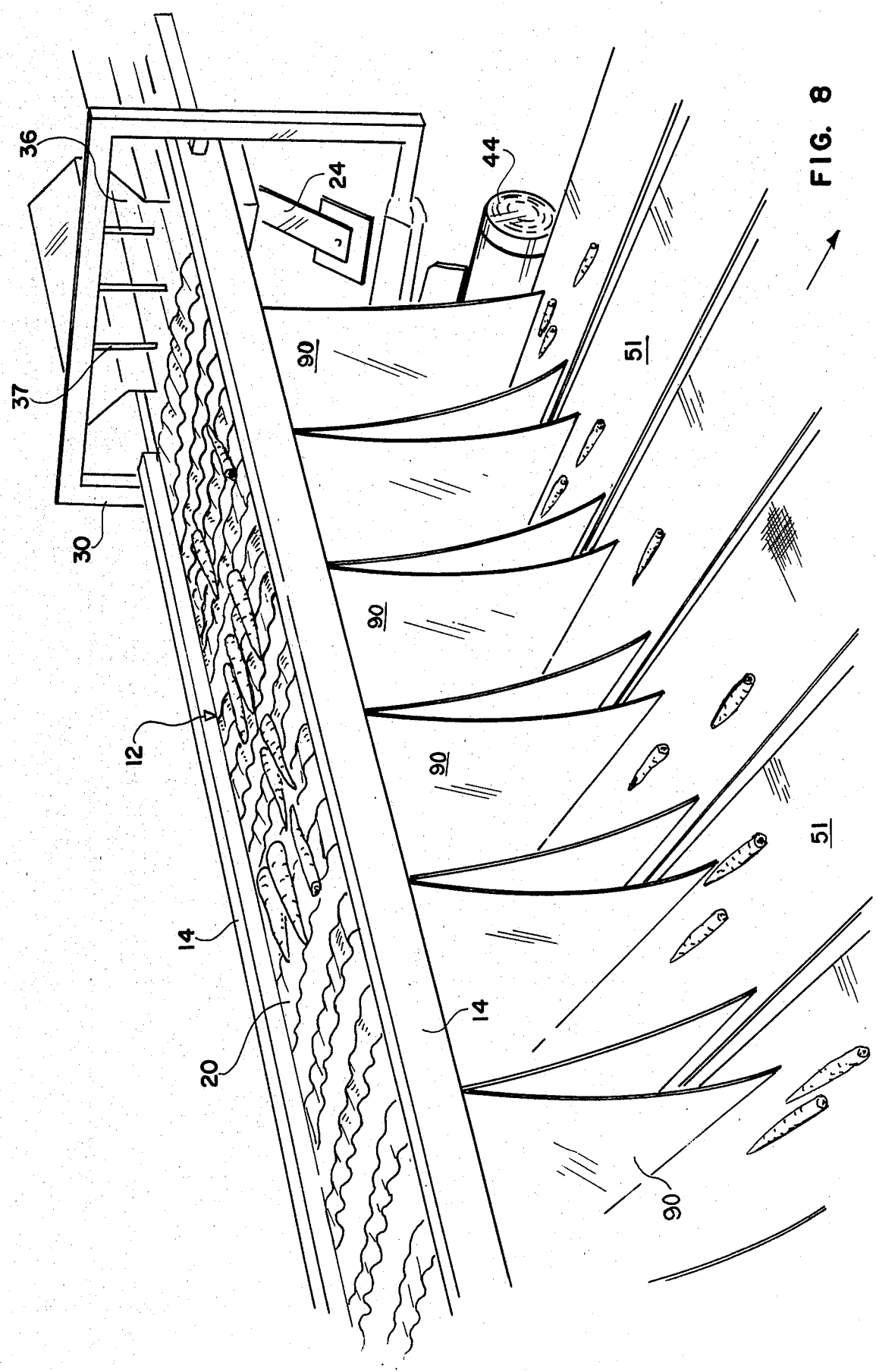
FIG. 8 is a perspective view of an embodiment of my machine that will serve to sort carrots or other elongate tapered vegetables to length.

FIG. 8 shows an embodiment of my invention concerned with achieving a separation of the carrots into specific lengths. Separators 90 rather than chutes are used, with the carrots of each specific length falling onto respective belts 51. Packaging means may be utilized at or near the end of each belt.

With regard to the orienter portion of my invention, it is important to note that by virtue of the comparatively small incremental increases of the spaces between members 20 that I utilize in accordance with my novel design, I am able to orient even those carrots exhibiting a only very small balance difference, such as carrots that have been broken, or carrots that inherently possess a small amount of taper.

Although I have illustrated in the preferred embodiment of my invention, spaced members that are corrugated, it is to be realized that I am not to be limited thereto, and another form of alignment means may be preferred to the corrugations. For example, the members 20 may be created to form a series of V-shaped notches instead of corrugations, or flat members 20 can be utilized, to which are secured appropriately configured members designed to bring about the elongate vegetables moving into alignment with the longitudinal axis of the vibratory table 12.

I claim:

1. A machine for effecting an orientation of carrots or other elongate, tapered vegetables placed thereon, said machine comprising a vibratory table of elongate configuration, with one end of said table being somewhat higher than the other, the upper surface of said table being principally constituted by a plurality of generally parallel, corrugated members spaced along the longitudinal centerline of the table, with the spacing between the members increasing incrementally such that the minimum spacing between members exists at said one end of the table, and the maximum spacing between members exists at the other end, the corrugations of said members being longitudinally aligned and serving as alignment means for bringing about an alignment of vegetables deposited adjacent said one end of said table, such that elongate vegetables individually aligned with the longitudinal axis of the table can travel for a portion of the length of the table, bridging at least some of the spaces between corrugated members, at least two leaf springs being utilized at each end of said table to provide a substantial degree of freedom and mobility to said table, vibration-producing means connected to said vibratory table for inducing sufficient vibration into said corrugated members as to cause the elongate vegetables to travel toward said other end of the table until such time as each vegetable has reached a space between two corrugated members that it is unable to bridge, at which time it falls crown end first between such pair of members, chute means for receiving the vegetables and directly delivering same to a topping device, said topping device functioning to rapidly and consistently sever the crowns from the vegetables.

2. The machine as defined in claim 1 in which said topping device utilizes a conveyor belt mounted with its upper surface inclined at a substantial angle to the vertical, said belt traveling in a direction opposite the movement of vegetables along the surface of said table, said chute means serving to deposit the aligned vegetables dropping from between said corrugated members onto said belt, such arrangement serving to deposit longer vegetables onto the belt prior to the deposit of the shorter ones, thus to improve the uniformity of the positioning of the vegetables prior to the removal of the crowns therefrom.

3. A machine for effecting an orientation of carrots or other elongate tapered vegetables placed thereon, said machine comprising a vibratory table of elongate configuration involving the use of a pair of elongate, spaced-apart structural members, the upper surface of said table being principally constituted by a plurality of generally parallel, corrugated members spaced along the longitudinal centerline of the table essentially at right angles to said structural members, with the ends of said corrugated members being supported by said structural members, the corrugations of said corrugated members being in alignment and the spacing between said corrugated members increasing incrementally such that the minimum spacing between said corrugated members exists at one end of said table, and the maximum spacing exists at the other end thereof, the distance between said elongate structural members being several times the length of the corrugations of each of said corrugated members, the overall arrangement being such that elongate vegetables deposited adjacent the corrugated members at said one end of said table become individually aligned with the longitudinal axis of the table and able to travel along the corrugations for at least a portion of the length of the table, bridging at least some of the spaces between corrugated members, each end of said table being supported by at least two leaf springs, and vibration-producing means connected to said vibratory table for inducing sufficient vibration into said spaced corrugated members as to cause the elongate vegetables to travel toward said other end of the table until such time as each vegetable has reached a space between a pair of said corrugated members that it is unable to bridge, at which time the heavier, crown end falls first between such pair of corrugated members.

4. The machine as defined in claim 3 in which one end of said table is higher than the other end, and said generally parallel members form an array downwardly stepped toward said other end.

5. The machine as defined in claim 3 in combination with means for sorting the elongate vegetables according to length, said means comprising a plurality of conveyor belts arranged to pass below the spaces between said spaced members, such that the vegetables of a common balance length falling from a particular space will be caught on a particular conveyor belt, and delivered to another location for further processing.

6. The machine as defined in claim 3 in which vegetables dropping away from contact with said corrugated members are carried by chutes and directly deposited onto a powered conveyor belt, said belt being driven in a direction opposite the direction of movement of vegetables along said corrugated members, and crown removal means disposed adjacent said belt, the arrangement being such that longer vegetables are loaded onto said belt prior to the shorter ones, thus to improve uniformity of position of the vegetables immediately prior to a topping procedure in which the crown ends of the vegetables are removed by said crown removal means.

7. The machine as defined in claim 6 in which said crown removal means is a circular knife blade driven in rotation.

8. The machine as defined in claim 7 wherein said circular knife blade is mounted upon an elongate shaft, upon which shaft a multiplicity of circular knife blades may be utilized in spaced relation when the elongate vegetables are to be cut into short sections.

9. A combinational machine for effecting the orientation of elongate vegetables as well as the subsequent removal of the crown ends thereof, said machine comprising a vibratory table of elongate configuration, with one end of said table somewhat higher than the other, the upper surface of said table being principally constituted by a plurality of generally parallel, corrugated members spaced along the longitudinal centerline of said table, with the spacing between said corrugated members increasing incrementally such that the minimum spacing between said members exists at said one end of said table, and the maximum spacing between members exists at said other end, the corrugations of said members being longitudinally aligned and serving as the alignment means for bringing about an alignment of elongate vegetables of varying length deposited adjacent said one end of said table, such that elongate vegetables individually aligned with the longitudinal axis of said table can travel for a portion of the length of the table, bridging at least some of the spaces between members, vibration-producing means for inducing sufficient vibration into said members as to cause the elongate vegetables to travel toward said other end of the table until such time as each vegetable has reached a space between two members that it is lengthwise unable to bridge, at which time it falls crown end first between such pair of corrugated members, chute means for receiving vegetables dropping from between said members and delivering same to a location upon a powered conveyor belt disposed at a substantial angle to the vertical, said conveyor belt being driven in a direction opposite the direction of movement of vegetables down along the series of corrugated members, with the arrangement being such that longer vegetables are deposited upon said conveyor belt prior to the arrival of the shorter vegetables, thus substantially aiding the alignment of vegetables for a crown removal operation, and cutting means for removing the crown ends of said vegetables as they move along said conveyor belt.

10. The machine as defined in claim 9 in which said cutting means is a circular saw blade mounted upon a rotating shaft, said shaft being designed to optionally receive one or more additional circular saw blades, to be disposed in spaced relation along said shaft, a combination of spaced circular saw blades collectively serving on occasion to cut elongate vegetables into short components of a desired size.

* * * * *